(12) United States Patent
Koide et al.

(10) Patent No.: US 6,545,735 B1
(45) Date of Patent: Apr. 8, 2003

(54) REFLECTIVE PLATE STRUCTURE PROVIDED IN A REFLECTIVE LIQUID CRYSTAL DISPLAY HAVING A THIN FILM TRANSISTOR

(75) Inventors: Shin Koide, Tokyo (JP); Takuya Katou, Tokyo (JP); Shuuki Yamamori, Tokyo (JP); Kesao Noguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 130 days.

(21) Appl. No.: 09/621,744

(22) Filed: Jul. 21, 2000

Related U.S. Application Data

(62) Division of application No. 08/898,388, filed on Jul. 22, 1997, now Pat. No. 6,154,264.

(30) Foreign Application Priority Data

Jul. 22, 1996 (JP) ............................................. 8-191286

(51) Int. Cl.[7] ........................................... G02F 1/1335
(52) U.S. Cl. ...................................................... 349/113
(58) Field of Search ................................. 349/113, 122, 349/138, 43, 47

(56) References Cited

U.S. PATENT DOCUMENTS

| | | | | |
|---|---|---|---|---|
| 3,832,034 A | * | 8/1974 | Edmonds ..................... | 349/44 |
| 4,382,658 A | * | 5/1983 | Shields et al. ............... | 349/122 |
| 4,431,272 A | * | 2/1984 | Yazawa et al. .............. | 349/113 |
| 4,519,678 A | * | 5/1985 | Komatsubara et al. ...... | 349/113 |
| 4,648,691 A | * | 3/1987 | Oguchi et al. .............. | 349/113 |
| 4,723,838 A | * | 2/1988 | Aoki et al. .................... | 349/47 |
| 5,042,918 A | * | 8/1991 | Suzuki ......................... | 349/42 |
| 5,299,041 A | * | 3/1994 | Morin et al. .................. | 349/42 |
| 5,767,827 A | * | 6/1998 | Kobayashi et al. .......... | 345/87 |

FOREIGN PATENT DOCUMENTS

JP          56-055920     *  5/1981    ................. 349/113

* cited by examiner

Primary Examiner—Kenneth Parker
(74) Attorney, Agent, or Firm—Choate, Hall & Stewart

(57) ABSTRACT

In a reflective liquid crystal display, source/drain electrodes are formed on an insulation substrate and separated from each other. A pixel electrode is provided which has an end portion unitary formed with the source electrode and the pixel electrode extending over the insulation substrate. A semiconductor layer extends over the insulation substrate in contact directly with a gap between the source/drain electrodes and also extends on at least respective parts of the source/drain electrodes for connecting the source/drain electrodes. A gate insulation film extends over entire parts of the semiconductor layer. A gate electrode extends on at least a part of the gate insulation film so that the gate electrode is positioned to cover the semiconductor layer and to be separated by the gate insulation film from the semiconductor layer for shielding the semiconductor layer from incident light. A reflective plate is formed over the pixel electrode so as to be separated from the gate electrode and from the semiconductor layer. An opposite electrode is supported on a surface of an opposite substrate so that the opposite electrode is separated by a space filled with a liquid crystal from the gate electrode and from the reflective plate and also that the opposite electrode faces to the gate electrode and the reflective plate.

20 Claims, 7 Drawing Sheets

1 : insulation substrate
2 : gate electrode
3 : gate insulation film
4 : semiconductor layer
5 : reflective plate
6 : drain electrode
7 : liquid crystal
8 : opposite electrode
9 : opposite substrate
10 : color filter 1 : insulation substrate
6 : drain electrode
11 : source electrode 6 : drain electrode
11 : source electrode 1 : insulation substrate   5 : reflective plate
2 : gate electrode         6 : drain electrode
3 : gate insulation film   11 : source electrode
4 : semiconductor layer 2 : gate electrode         5 : reflective plate
3 : gate insulation film   6 : drain electrode
4 : semiconductor layer    11 : source electrode 1 : insulation substrate    6 : drain electrode
2 : gate electrode          7 : liquid crystal
3 : gate insulation film    8 : opposite electrode
4 : semiconductor layer     9 : opposite substrate
5 : reflective plate        11 : source electrode 1 : insulation substrate
6 : drain electrode
11 : source electrode 1 : insulation substrate
3 : gate insulation film
4 : semiconductor layer
6 : drain electrode
11 : source electrode 1 : insulation substrate
2 : gate electrode
3 : gate insulation film
4 : semiconductor layer
5 : reflective plate
6 : drain electrode
11 : source electrode
12 : chromium layer
13 : aluminum layer 1 : insulation substrate
2 : gate electrode
3 : gate insulation film
4 : semiconductor layer
5 : reflective plate
6 : drain electrode
11 : source electrode
12 : chromium layer
13 : aluminum layer 1 : insulation substrate
2 : gate electrode
3 : gate insulation film
4 : semiconductor layer
5 : reflective plate
6 : drain electrode
11 : source electrode

REFLECTIVE PLATE STRUCTURE PROVIDED IN A REFLECTIVE LIQUID CRYSTAL DISPLAY HAVING A THIN FILM TRANSISTOR

CROSS REFERENCE TO RELATED APPLICATIONS

This application is a divisional of U.S. patent application Ser. No. 08/898,388 filed Jul. 22, 1997 now U.S. Pat. No. 6,154,264.

BACKGROUND OF THE INVENTION

The present invention relates to a reflective liquid crystal display using thin film transistors and a method of forming the same.

A conventional reflective liquid crystal display using thin film transistors disclosed in the Japanese laid-open patent publication No. 5-224186 will be described with reference to FIG. 1. The reflective liquid crystal display is formed on an insulation substrate 1 such as a glass substrate. A gate electrode 2 is selectively formed on the insulation substrate 1. A gate insulation film is provided which extends over the gate electrode 2 and the top surface of the insulation substrate 1. A semiconductor layer 4 is selectively provided over a part of the gate insulation film 3 extending over the gate electrode 2 so that the semiconductor layer 4 covers over the gate electrode 2. A drain electrode 6 is selectively provided on a part of the semiconductor layer 4. A source electrode is provided on other part of the semiconductor layer 4 but separately from the drain electrode 6 so as to form an opening between the source and drain electrodes whereby a center part of the semiconductor layer 4 is shown by the opening for allowing a light to be incident through the opening into the semiconductor layer 4. The semiconductor layer 4 may be made of an amorphous silicon or a polysilicon so that when the semiconductor layer 4 absorbs a light having been incident, this generates carriers in the semiconductor layer 4. The semiconductor layer 4 may optionally be doped heavily with an n-type impurity to form an ohmic contact with the drain electrode 6. A reflective plate 5 serving as a pixel electrode is formed which extends over the gate insulation film 3. The reflective plate 5 is unitary formed with the source electrode which is positioned over the other part of the semiconductor layer 4. A color filter 10 is provided which extends over the reflective plate 5. An opposite electrode 8 is provided to be spaced apart from the reflective plate 5. The opposite electrode 8 is arranged which extends in parallel to the insulation substrate 1. The opposite electrode 8 is supported on a bottom surface of an opposite substrate 9. A liquid crystal is filled in the space defined between the opposite electrode and the reflective plate 5. The reflective plate 5 is made of a highly reflective material, for example, aluminum. The transistor formed over the substrate is an. inverted stagger transistor.

Operations of the above transistor will subsequently be described. A gate voltage is applied to the gate electrode 2, then the drain electrode 6 is made conductive through the semiconductor layer 4 to the source electrode unitary formed with the pixel electrode in the form of the reflective plate 5. As a bias is applied across the drain electrode 6 and the pixel electrode, a current flows through the semiconductor layer 4 between the drain electrode 6 and the pixel electrode until the drain electrode 6 is the same in potential as the source electrode unitary formed with the pixel electrode in the form of the reflective plate 5. After the application of the gate voltage Vo the gate electrode 2 is discontinued, no current flows between the drain electrode 6 and the pixel electrode. Charges remain stored in the pixel electrode. As a result, a voltage between the opposite electrode 8 and the pixel electrode is controllable by the transistor. The liquid crystal is optically changed by the variation in voltage between the drain electrode 6 and the pixel electrode. The color filter 10 allows a color display. The opposite electrode 8 and the opposite substrate 9 are made of an optically transparent material.

Incident light is transmitted through the opposite substrate 9 and the opposite electrode 8 into the liquid crystal 7. The incident light is then transmitted through the color filter 10 to reach the surface of the reflective plate 5 and reflected by the reflective plate 5. The reflected light is then transmitted through the color filter 10 and the liquid crystal 7 and further transmitted through the opposite electrode 8 and the opposite substrate 9. Other incident light is transmitted through the opposite substrate 9 and the opposite electrode 8 into the liquid crystal 7 and then transmitted through the opening between the drain electrode 6 and the source electrode to the semiconductor layer 4. The incident light is irradiated onto the semiconductor layer 4 and absorbed by the semiconductor layer 4. The absorption of the incident light causes generation of carriers, for example, electron-hole pairs in the semiconductor layer 4. Even if the pixel electrode was charged to apply an electric field to the liquid crystal 7, then the generation of carriers, for example, electron-hole pairs in the semiconductor layer 4 causes a current flowing between the pixel electrode and the drain electrode whereby the pixel electrode is discharged. As a result, the intensity of the electric field applied to the liquid crystal is dropped. This means all of the pixel electrodes are not charged and a reduced or almost no electric field is applied to the entire of the liquid crystal 7. This further means that contrast of the liquid crystal display is lowered.

It is, therefore, required to prevent the light from incidence into the semiconductor layer 4 or to shield the semiconductor layer 4 from the incidence of the light.

As described above, the reflective plate 5 is made of aluminum which has a high reflectivity but not chromium having a low reflectivity because if the reflective plate 5 is made of aluminum, then a sufficiently bright display can be obtained. If, however, the reflective plate 5 is made of chromium, then a dark display is obtained, which is unavailable.. The reflective plate 5 made of aluminum however has a disadvantage in diffusion of aluminum into the semiconductor layer 4 made of polysilicon or amorphous silicon whereby the characteristic of the transistor is deteriorated.

Further more, the semiconductor layer 4 is made contact through a thin orientation film such as a polyimide film with the liquid crystal 7. The polyimide film is incapable of blocking ions in the liquid crystal 7 for allowing the ions passing through the polyimide orientation film to the semiconductor layer 4, for which reason the semiconductor layer 4 is contaminated with the ions in the liquid crystal 7. As a result, the characteristic of the transistor is deteriorated.

If, in order to settle the above problem, it was proposed to provide an inorganic insulation film over the semiconductor layer 4 for having the inorganic insulation film cover the semiconductor layer 4. The inorganic insulation film may comprise a silicon nitride film having been formed by a plasma enhanced chemical vapor deposition method. The inorganic insulation film cover the semiconductor layer 4 is required to selectively be removed for allowing opposite side regions to be shown so that source and drain electrodes may be formed on the opposite side regions. The insulation film may selectively be removed by, for example, photolithography but this additional process causes increase in the manufacturing cost of the reflective liquid crystal display.

In the above circumstances, it had been required to develop a novel reflective liquid crystal display free from the above problems in deterioration in display caused by generation of carriers, for example, electron-hole pairs in a semiconductor layer connecting the source/drain electrode due to incidence of light into the semiconductor layer.

SUMMARY OF THE INVENTION

Accordingly, it is an object of the present invention to provide a novel reflective liquid crystal display free from the above problems.

It is a further object of the present invention to provide a novel reflective liquid crystal display free from deterioration in display caused by generation of carriers, for example, electron-hole pairs in a semiconductor layer connecting the source/drain electrode due to incidence of light into the semiconductor layer.

It is a still further object of the present invention to provide a novel reflective liquid crystal display which may be formed at a relatively low manufacturing cost.

It is yet a further object of the present invention to provide a novel reflective liquid crystal display capable of a bright display with high contrast.

It is moreover object of the present invention to provide a novel reflective liquid crystal display including thin film transistors showing highly reliable operations.

It is further more object of the present invention to provide a novel reflective liquid crystal display having thin film transistors showing highly reliable operations.

It is further more object of the present invention to provide a novel reflective liquid crystal display having a reflective plate with a sufficiently large thickness and a rough surface but free from excess reflection.

It is still more object of the present invention to provide a novel reflective liquid crystal display with a wide visible angle.

It is yet more object of the present invention to provide a novel reflective liquid crystal display having gate electrodes with a reduced resistance but free of any substantial delay in transmission of signals.

It is a still further more object of the present invention to provide a novel reflective liquid crystal display free from deterioration in characteristics of a thin film transistor in the reflective liquid crystal display.

It is yet further more object of the present invention to provide a novel reflective liquid crystal display having thin film transistors having semiconductor layers which are free from exposure to liquid crystal in the reflective liquid crystal display.

It is an additional object of the present invention to provide a novel reflective liquid crystal display having a semiconductor layer free from deterioration due to contamination to the semiconductor layer with aluminum caused by contacting an aluminum reflective plate to the semiconductor layer.

It is a further additional object of the present invention to provide a novel reflective liquid crystal display having an aluminum reflective plate free from deformations such as hillock.

It is another object of the present invention to provide a novel reflective liquid crystal display which may be formed without carrying out excess or additional fabrication processes at a relatively low manufacturing cost.

The above and other objects, features and advantages of the present invention will be apparent from the following descriptions.

The present invention provides a reflective liquid crystal display comprising the following elements. Source/drain electrodes are formed on an insulation substrate. The source/drain electrodes are separated from each other. A pixel electrode is provided which has an end portion unitary formed with the source electrode and the pixel electrode extending over the insulation substrate. A semiconductor layer extends over the insulation substrate in contact directly with a gap between the source/drain electrodes and also extends on at least respective parts of the source/drain electrodes for connecting the source/drain electrodes. A gate insulation film extends over entire parts of the semiconductor layer. A gate electrode extends on at least a part of the gate insulation film so that the gate electrode is positioned to cover the semiconductor layer and to be separated by the gate insulation film from the semiconductor layer for shielding the semiconductor layer from incident light. A reflective plate is formed over the pixel electrode so as to be separated from the gate electrode and from the semiconductor layer. An opposite electrode is supported on a surface of an opposite substrate so that the opposite electrode is separated by a space filled with a liquid crystal from the gate electrode and from the reflective plate and also that the opposite electrode faces to the gate electrode and the reflective plate.

BRIEF DESCRIPTION OF THE DRAWINGS

Preferred embodiments of the present invention will be described in detail with reference to the accompanying drawings.

DISCLOSURE OF THE INVENTION

Figure 1:
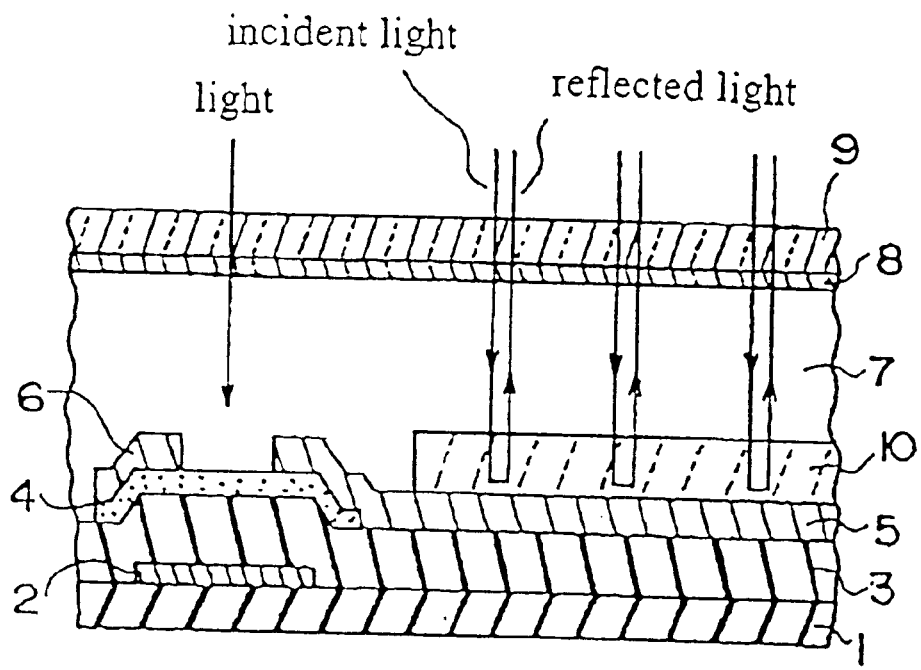
FIG. 1 is a fragmentary cross sectional elevation view illustrative of the conventional reflective liquid crystal display.

The present invention provides a thin film transistor provided in a reflective liquid crystal display. The thin film transistor comprises the following elements. Source/drain electrodes are formed on an insulation substrate. The source/drain electrodes are separated from each other. A semiconductor layer extends over the insulation substrate between the source/drain electrodes and also extends on at least respective parts of the source/drain electrodes for connecting the source/drain electrodes. A gate insulation film extends over entire parts of the semiconductor layer so that the gate insulation film covers the entire parts of the semiconductor layer. A gate electrode extends on at least a part of the gate insulation film so that the gate electrode is separated by the gate insulation film from the semiconductor layer.

It is possible to further provide an inorganic film extending over an entire surface of the substrate and under the source/drain electrodes.

It is preferable that the inorganic film is made of one selected from the group consisting of silicon oxide and silicon nitride.

It is also preferable that the source/drain electrodes are made of a refractory metal.

The present invention provides a reflective plate structure provided in a reflective liquid crystal display having a thin film transistor. The reflective plate structure extends over a source electrode having an end portion unitary formed with a pixel electrode. The reflective plate structure is separated from a semiconductor layer and a gate electrode which are of the thin film transistor.

It is preferable that the reflective plate structure comprises a single metal plate having a flat top surface.

It is also preferable that the reflective plate structure comprises a single metal plate having a rough top surface.

It is also preferable that the reflective plate is made of a metal selected from the group consisting of aluminum and aluminum-based alloys.

It is also preferable that the reflective plate is made of a metal selected from the group consisting of platinum, silver, platinum-based alloys and silver-based alloys.

The present invention provides a reflective plate structure provided in a reflective liquid crystal display which includes a thin film transistor, a pixel electrode having an end portion unitary formed with a source electrode of the thin film transistor, a semiconductor layer extending over the pixel electrode and being separated from the thin film transistor, and an insulation film extending over the semiconductor layer, wherein the reflective plate structure comprises a single metal plate which extends over the insulation film and is separated from the thin film transistor.

It is also preferable that the reflective plate structure has a flat top surface.

It is also preferable that the reflective plate structure has a rough top surface.

It is also preferable that the reflective plate structure is made of a metal selected from the group consisting of aluminum and aluminum-based alloys.

It is also preferable that the reflective plate structure is made of a metal selected from the group consisting of platinum, silver, platinum-based alloys and silver-based alloys.

The present invention provides a reflective plate structure provided in a reflective liquid crystal display which includes a thin film transistor, a pixel electrode having an end portion unitary formed with a source electrode of the thin film transistor, a semiconductor layer extending over the pixel electrode and being separated from the thin film transistor, and an insulation film extending over the semiconductor layer, wherein the reflective plate structure comprises a low reflectivity film continuously extending over the insulation film and a plurality of ridges provided on the low reflectivity film and each of the plurality of ridges comprises a high reflectivity film.

It is preferable that the low reflectivity film is made of chromium and the high reflectivity film is made of a metal selected from the group consisting of aluminum and aluminum-based alloys.

It is also preferable that the low reflectivity film is made of chromium and the reflective plate is made of a metal selected from the group consisting of platinum, silver, platinum-based alloys and silver-based alloys.

The present invention provides a reflective plate structure provided in a reflective liquid crystal display which includes a thin film transistor selectively formed on an insulation substrate, a pixel electrode both having an end portion unitary formed with a source electrode of the thin film transistor and discontinuously extending over an insulation substrate, a semiconductor layer also discontinuously extending over the pixel electrode, and an insulation film also discontinuously extending over the semiconductor layers so that a plurality of ridges are provided over the insulation substrate and each of the plurality of ridges comprises laminations of the pixel electrode, and the semiconductor layer and the insulation film, and the insulation substrate are shown through gaps between the plurality of ridges, wherein the reflective plate structure comprises a metal plate which continuously extends over the plurality of ridges and the insulation substrate in contact directly with gaps between the plurality of ridges so that a top surface of the metal plate has concave and convex portions.

It is preferable that the reflective plate is made of a metal selected from the group consisting of aluminum and aluminum-based alloys.

It is also preferable that the reflective plate is made of a metal selected from the group consisting of platinum, silver, platinum-based alloys and silver-based alloys.

The present invention provides a reflective liquid crystal display comprising the following elements. Source/drain electrodes are formed on an insulation substrate. The source/drain electrodes are separated from each other. A pixel electrode is provided which has an end portion unitary formed with the source electrode and the pixel electrode extending over the insulation substrate. A semiconductor layer extends over the insulation substrate in contact directly with a gap between the source/drain electrodes and also extends on at least respective parts of the source/drain electrodes for connecting the source/drain electrodes. A gate insulation film extends over entire parts of the semiconductor layer. A gate electrode extends on at least a part of the gate insulation film so that the gate electrode is positioned to cover the semiconductor layer and to be separated by the gate insulation film from the semiconductor layer for shielding the semiconductor layer from incident light. A reflective plate is formed over the pixel electrode so as to be separated from the gate electrode and from the semiconductor layer. An opposite electrode is supported on a surface of an opposite substrate so that the opposite electrode is separated by a space filled with a liquid crystal from the gate electrode and from the reflective plate and also that the opposite electrode faces to the gate electrode and the reflective plate.

It is preferable that the semiconductor layer extends over the source/drain electrodes and the insulation substrate in contact directly with the gap between the source/drain electrodes, and that the gate insulation film extends over the semiconductor layer, and also that the gate electrode extends over the gate insulation film and the reflective plate comprises a single metal film which extends over the pixel electrode and being separated from the semiconductor layer.

It is also preferable that the single metal film has a flat top surface.

It is also preferable that the single metal film has a rough top surface.

It is also preferable that the reflective plate is made of a metal selected from the group consisting of aluminum and aluminum-based alloys.

It is also preferable that the reflective plate is made of a metal selected from the group consisting of platinum, silver, platinum-based alloys and silver-based alloys.

It is also preferable that the semiconductor layer comprise a first semiconductor layer part extending over the source/drain electrodes and the insulation substrate in contact directly with a gap between the source/drain electrodes, and a second semiconductor layer part extending over the pixel electrode and being separated from the first semiconductor layer part. It is also preferable that the gate insulation film comprises a first gate insulation film part extending over the first semiconductor layer part, and a second gate insulation film part extending over the second semiconductor layer part. It is also preferable that the gate electrode extends over the first gate insulation film part and the reflective plate comprises a single metal film which extends over the second gate insulation film part.

It is also preferable that the single metal film has a flat top surface.

It is also preferable that the single metal film has a rough top surface.

It is also preferable that the reflective plate is made of a metal selected from the group consisting of aluminum and aluminum-based alloys.

It is also preferable that the reflective plate is made of a metal selected from the group consisting of platinum, silver, platinum-based alloys and silver-based alloys.

It is also preferable that the semiconductor layer comprises a first semiconductor layer part extending over the source/drain electrodes and the insulation substrate in contact directly with a gap between the source/drain electrodes, and a second semiconductor layer part extending over the pixel electrode and being separated from the first semiconductor layer part. It is also preferable that the gate insulation film comprises a first gate insulation film part extending over the first semiconductor layer part, and a second gate insulation film part extending over the second semiconductor layer part. It is also preferable that the gate electrode extends over the first gate insulation film part. It is also preferable that the reflective plate extends over the second gate insulation film part and comprises a low reflectivity film continuously extending over the second gate insulation film part and a plurality of ridges provided on the low reflectivity film and each of the plurality of ridges comprises a high reflectivity film.

It is also preferable that the low reflectivity film is made of chromium and the high reflectivity film is made of a metal selected from the group consisting of aluminum and aluminum-based alloys.

It is also preferable that the low reflectivity film is made of chromium and the reflective plate is made of a metal selected from the group consisting of platinum, silver, platinum-based alloys and silver-based alloys.

It is also preferable that the pixel electrode comprises films which discontinuously extend over the insulation substrate. It is also preferable that the semiconductor layer comprises a first semiconductor layer part continuously extending over the source/drain electrodes and the insulation substrate in contact directly with the gap between the source/drain electrodes, and second semiconductor layer parts discontinuously extending over the pixel electrodes and being separated from the first semiconductor layer part. It is also preferable that the gate insulation film comprises a first gate insulation film part extending over the first semiconductor layer part, and second gate insulation film parts extending over the second semiconductor layer parts. It is also preferable that the gate electrode extends over the first gate insulation film part, so that a plurality of ridges are provided over the insulation substrate and each of the plurality of ridges comprises laminations of the pixel electrode, the semiconductor layer and the insulation film, and that the insulation substrate is shown through gaps between the plurality of ridges. The reflective plate structure comprises a metal plate which continuously extends over the plurality of ridges and the insulation substrate in contact directly with gaps between the plurality of ridges so that a top surface of the metal plate has concave and convex portions.

It is preferable that the reflective plate is made of a metal selected from the group consisting of aluminum and aluminum-based alloys.

It is also preferable that the reflective plate is made of a metal selected from the group consisting of platinum, silver, platinum-based alloys and silver-based alloys.

It is also preferable to further provide a color filter over the reflective plate.

It is also preferable to further provide an inorganic film extending over an entire surface of the substrate and under the source/drain electrodes and the inorganic film is made of one selected from the group consisting of silicon oxide and silicon nitride.

It is also preferable that the source/drain electrodes are made of a refractory metal.

The present invention provides a reflective liquid crystal display substrate structure having a pair of a thin film transistor and a pixel electrode. The reflective liquid crystal display substrate structure comprises the following elements. Source/drain electrodes are formed on an insulation substrate. The source/drain electrodes are separated from each other. A pixel electrode is provided which has an end portion unitary formed with the source electrode and the pixel electrode extending over the insulation substrate. A semiconductor layer extends over the insulation substrate in contact directly with a gap between the source/drain electrodes and also extending on at least respective parts of the source/drain electrodes for connecting the source/drain electrodes. A gate insulation film extends over entire parts of the semiconductor layer. A gate electrode extends on at least a part of the gate insulation film so that the gate electrode is positioned to cover the semiconductor layer and to be separated by the gate insulation film from the semiconductor layer for shielding the semiconductor layer from incident light. A reflective plate is formed over the pixel electrode so as to be separated from the gate electrode and from the semiconductor layer.

It is preferable that the semiconductor layer extends over the source/drain electrodes and the insulation substrate in contact directly with the gap between the source/drain electrodes. It is also preferable that the gate insulation film extends over the semiconductor layer. It is also preferable that the gate electrode extends over the gate insulation film and the reflective plate comprises a single metal film which extends over the pixel electrode and being separated from the semiconductor layer.

It is also preferable that the single metal film has a flat top surface.

It is also preferable that the single metal film has a rough top surface.

It is also preferable that the reflective plate is made of a metal selected from the group consisting of aluminum and aluminum-based alloys.

It is also preferable that the reflective plate is made of a metal selected from the group consisting of platinum, silver, platinum-based alloys and silver-based alloys.

It is also preferable that the semiconductor layer comprises a first semiconductor layer part extending over the source/drain electrodes and the insulation substrate in contact directly with a gap between the source/drain electrodes, and a second semiconductor layer part extending over the pixel electrode and being separated from the first semiconductor layer part. It is also preferable that the gate insulation film comprises a first gate insulation film part extending over the first semiconductor layer part, and a second gate insulation film part extending over the second semiconductor layer part. It is also preferable that the gate electrode extends over the first gate insulation film part and the reflective plate comprises a single metal film which extends over the second gate insulation film part.

It is also preferable that the single metal film has a flat top surface.

It is also preferable that the single metal film has a rough top surface.

It is also preferable that the reflective plate is made of a metal selected from the group consisting of aluminum and aluminum-based alloys.

It is also preferable that the reflective plate is made of a metal selected from the group consisting of platinum, silver, platinum-based alloys and silver-based alloys.

It is also preferable that the semiconductor layer comprises a first semiconductor layer part extending over the source/drain electrodes and the insulation substrate in contact directly with a gap between the source/drain electrodes, and a second semiconductor layer part extending over the pixel electrode and being separated from the first semiconductor layer part. It is also preferable that the gate insulation film comprises a first gate insulation film part extending over the first semiconductor layer part, and a second gate insulation film part extending over the second semiconductor layer part. It is also preferable that the gate electrode extends over the first gate insulation film part. It is also preferable that the reflective plate extends over the second gate insulation film part and comprises a low reflectivity film continuously extending over the second gate insulation film part and a plurality of ridges provided on the low reflectivity film and each of the plurality of ridges comprises a high reflectivity film.

It is also preferable that the low reflectivity film is made of chromium and the high reflectivity film is made of a metal selected from the group consisting of aluminum and aluminum-based alloys.

It is also preferable that the low reflectivity film is made of chromium and the reflective plate is made of a metal selected from the group consisting of platinum, silver, platinum-based alloys and silver-based alloys.

It is also preferable that the pixel electrode comprises films which discontinuously extend over the insulation substrate. It is also preferable that the semiconductor layer comprises a first semiconductor layer part continuously extending over the source/drain electrodes and the insulation substrate in contact directly with the gap between the source/drain electrodes, and second semiconductor layer parts discontinuously extending over the pixel electrodes and being separated from the first semiconductor layer part. It is also preferable that the gate insulation film comprises a first gate insulation film part extending over the first semiconductor layer part, and second gate insulation film parts extending over the second semiconductor layer parts. It is also preferable that the gate electrode extends over the first gate insulation film part, so that a plurality of ridges are provided over the insulation substrate and each of the plurality of ridges comprises laminations of the pixel electrode, the semiconductor layer and the insulation film, and also that the insulation substrate is shown through gaps between the plurality of ridges. The reflective plate structure comprises a metal plate which continuously extends over the plurality of ridges and the insulation substrate in contact directly with gaps between the plurality of ridges so that a top surface of the metal plate has concave and convex portions.

It is also preferable that the reflective plate is made of a metal selected from the group consisting of aluminum and aluminum-based alloys.

It is also preferable that the reflective plate is made of a metal selected from the group consisting of platinum, silver, platinum-based alloys and silver-based alloys.

It is also preferable to further provide a color filter over the reflective plate.

It is also preferable to further provide an inorganic film extending over an entire surface of the substrate and under the source/drain electrodes and the inorganic film is made of one selected from the group consisting of silicon oxide and silicon nitride.

It is also preferable that the source/drain electrodes are made of a refractory metal.

Preferred Embodiments

First Embodiment

Figure 2:
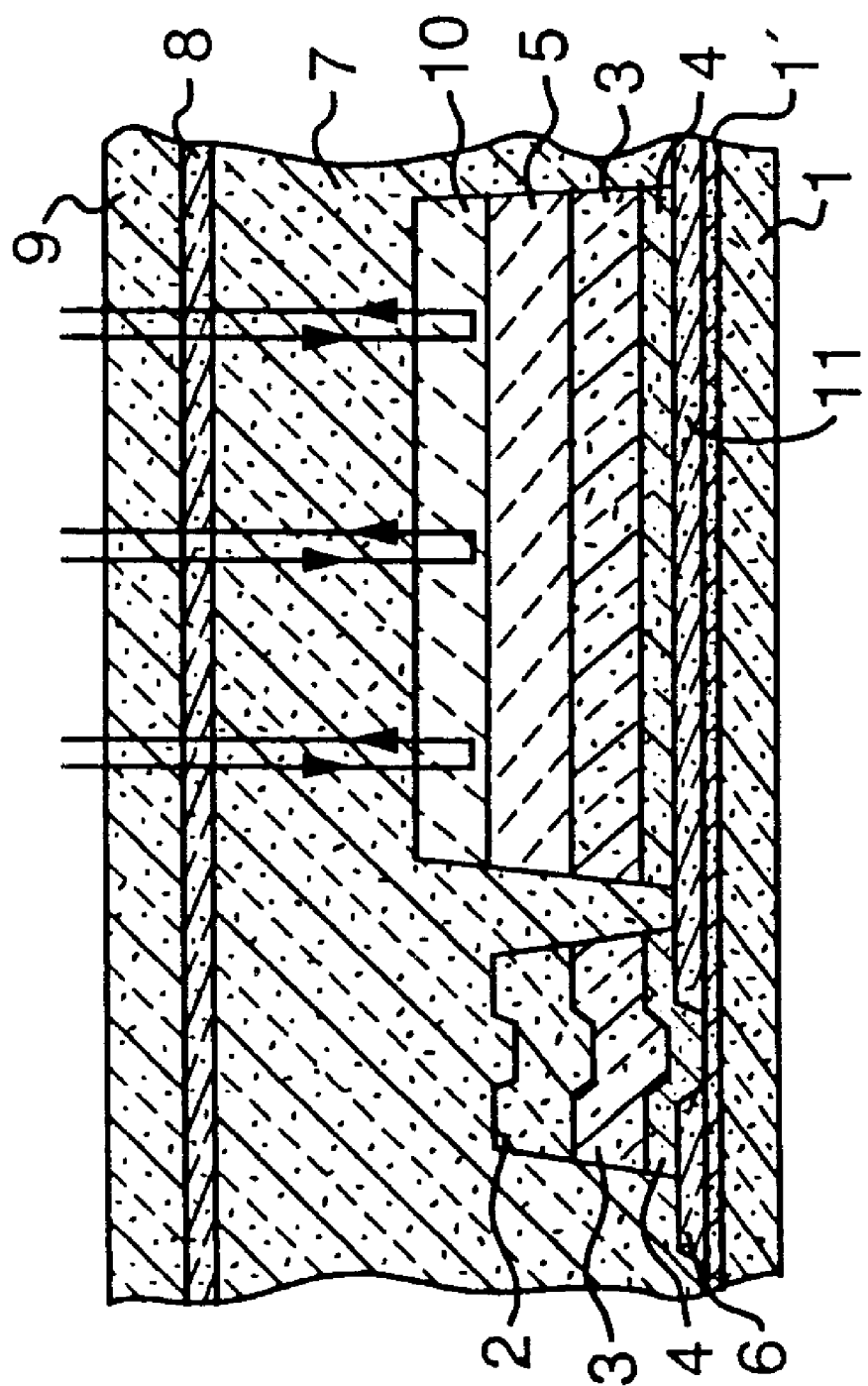
FIG. 2 is a fragmentary cross sectional elevation view illustrative of a novel reflective liquid crystal display in a first embodiment according to the present invention.
Figure 3A:
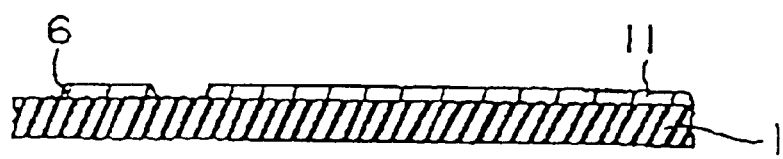
FIG. 3A is a fragmentary cross sectional elevation view illustrative of a reflective liquid crystal display substrate in a process involved in a method of fabricating a novel reflective liquid crystal display in a first embodiment according to the present invention.
Figure 3B:
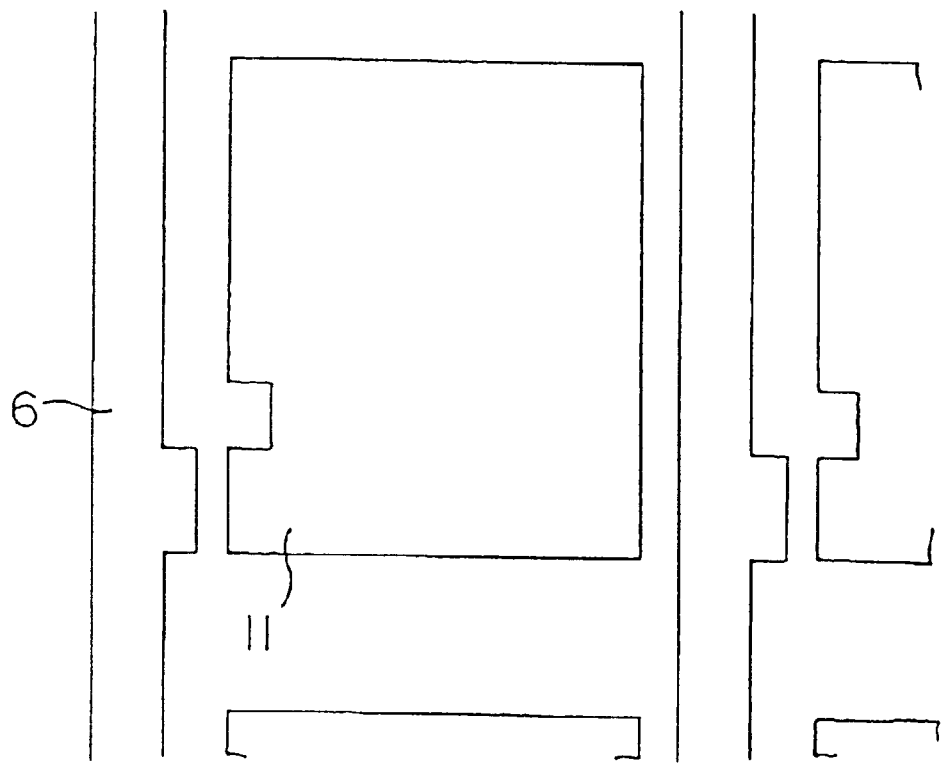
FIG. 3B is a plane view illustrative of a reflective liquid crystal display substrate of FIG. 3A.
Figure 4A:
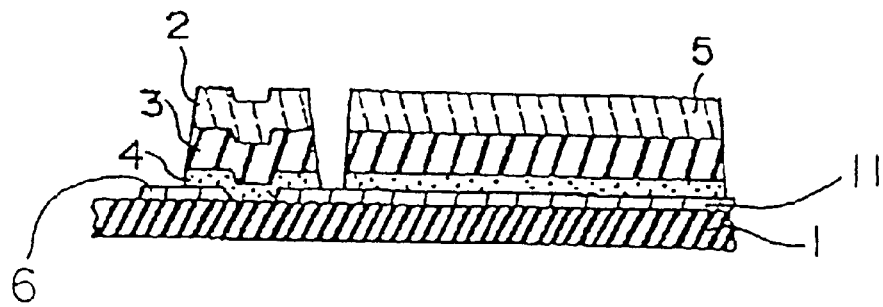
FIG. 4A is a fragmentary cross sectional elevation view illustrative of a reflective liquid crystal display substrate in another process involved in a method of fabricating a novel reflective liquid crystal display in a first embodiment according to the present invention.
Figure 4B:
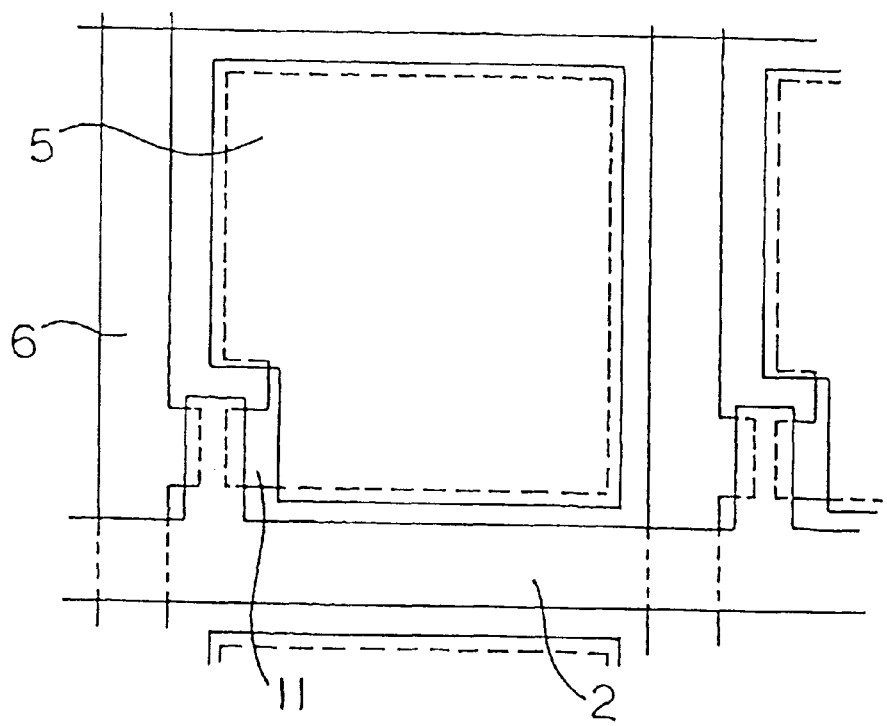
FIG. 4B is a plane view illustrative of a reflective liquid crystal display substrate of FIG. 4A.

A first embodiment according to the present invention will be described with reference to FIGS. 2, 3A, 3B, 4A and 4B. FIG. 2 is a fragmentary cross sectional elevation view illustrative of a novel reflective liquid crystal display in a first embodiment according to the present invention. FIG. 3A is a fragmentary cross sectional elevation view illustrative of a reflective liquid crystal display substrate in a process involved in a method of fabricating a novel reflective liquid crystal display in a first embodiment according to the present invention. FIG. 3B is a plane view illustrative of a reflective liquid crystal display substrate of FIG. 3A. FIG. 4A is a fragmentary cross sectional elevation view illustrative of a reflective liquid crystal display substrate in another process involved in a method of fabricating a novel reflective liquid crystal display in a first embodiment according to the present invention. FIG. 4B is a plane view illustrative of a reflective liquid crystal display substrate of FIG. 4A.

A reflective liquid crystal display has an integration of a plurality of pairs of a thin film transistor and a pixel electrode is formed on an insulation substrate 1 which may comprise a glass substrate. Each pair of the thin film transistor and the pixel electrode have the following structure. Source/drain electrodes 11 and 6 are formed on an insulation substrate. The source/drain electrodes 11 and 6 are separated from each other. A pixel electrode 11 is provided which has an end portion unitary formed with the source electrode 11 and the pixel electrode 11 extends over the insulation substrate 1. A semiconductor layer 4 extends over the insulation substrate 1 in contact directly with a gap between the source/drain electrodes 11 and 6 and also extends on at least respective parts of the source/drain electrodes 11 and 6 for connecting the source/drain electrodes 11 and 6. The source/drain electrodes 11 and 6 are made of a refractory metal such as Cr, W, Mo and Ti. Namely, the semiconductor layer 4 comprises a first semiconductor layer part extending over the source/drain electrodes 11 and 6 and over the insulation substrate 1 in contact directly with a gap between the source/drain electrodes 11 and 6, and a second semiconductor layer part extending over the pixel electrode 11 and is separated from the first semiconductor layer part. A gate insulation film 3 extends over entire parts of the semiconductor layer 4. Namely, the gate insulation film 3 comprises a first gate insulation film part extending over the first semiconductor layer part, and a second gate insulation film part extending over the second semiconductor layer part. A gate electrode 2 extends over the first gate insulation film part so that the gate electrode 2 is positioned to cover the semiconductor layer 4 and to be separated by the gate insulation film 3 from the semiconductor layer 4 for shielding the semiconductor layer 4 from incident light. A reflective plate 5 is formed over the pixel electrode 11 so as to be separated from the gate electrode 2 and from the semiconductor layer 4. The reflective plate 5 comprises a single metal film which extends over the pixel electrode 11 and being separated from the semiconductor layer 4. Although the single metal film may have a flat top surface, it is more preferable that the single metal film has a rough top surface for preventing excess reflection. The reflective plate 5 is preferably made of aluminum or aluminum-based alloys such as Al—Nd because aluminum and aluminum-based alloys have high reflectivity and are inexpensive. Notwithstanding, platinum, silver, platinum-based alloys and silver-based alloys are also available due to those high reflectivity. An opposite electrode 8 is supported on a surface of an opposite substrate 9 so that the opposite electrode 8 is separated by a space filled with a liquid crystal 7 from the gate electrode 2 and from the reflective plate 5 and also that the opposite electrode 8 faces to the gate electrode 2 and the reflective plate 5.

As a modification, it may be possible to further provide a color filter 10 over the reflective plate 5. It may be also possible to further provide an inorganic film 1 extending over an entire surface of the substrate 1 and under the source/drain electrodes 11 and 6 and the inorganic film 1 is made of silicon oxide or silicon nitride.

The above reflective liquid crystal display may be operated as follows. Charges are supplied through the thin film transistor to the pixel electrode 11 unitary formed with the source electrode 11. As described above, the reflective plate 5 is made of high reflectivity metal such as aluminum, for which reason a first capacitance is formed between the pixel electrode 11 and the reflective plate 5 as well as a second capacitance is formed between the reflective plate 5 and the opposite electrode 8. A capacitance between the pixel electrode 11 and the opposite electrode 8 is defined as a total value of the first capacitance and the second capacitance. The pixel electrode 11 and the reflective plate 5 are electrically isolated by the gate insulation film 3 to form the first capacitance "Cin". On the other hand, the reflective plate 5 and the opposite electrode 8 are separated by the liquid crystal 7 to form the second capacitance "Clc". The liquid crystal 7 is optically changed by a voltage "Vlc" applied between the reflective plate 5 and the opposite electrode 8. When a voltage "V" is applied between the pixel electrode 11 or the source electrode 11 and the opposite electrode 8, the voltage "Vlc" is given by the equation of:

$$Vlc = V \times Clc/(Clc+Cin) \qquad (1).$$

The liquid crystal 7 is optically changed by the voltage "Vlc" which is controllable by controlling the voltage "V" to be applied between the pixel electrode 11 or the source electrode 11 and the opposite electrode 8. The above description have been made considering that the reflective plate 5 is electrically floated and the initial potential of the reflective plate 5 is the same as the opposite electrode 8 or is zero. Namely, the voltage Vlc between the reflective plate 5 and the opposite electrode 8 is influenced by the initial potential of the reflective plate 5 if the initial potential of the reflective plate 5 is different from zero or from that of the opposite electrode 8. Actually, however, the liquid crystal 7 has an extremely low conductivity or a large resistively in the order of $10^{12}$ Ωcm, for which reason the reflective plate 5 has substantially the same initial potential as the opposite electrode 8.

The above reflective liquid crystal display may be fabricated as follows.

With reference to FIGS. 3A and 3B, a Cr film having a thickness of 50–100 nanometers is deposited on a glass substrate by sputtering Cr target. The Cr film is then patterned by a photo-lithography method and a printing method to form a drain electrode 6 and a source/pixel electrode 11. Preferably, the patterning is made to have edges of the drain electrode 6 and the source/pixel electrode 11 tapered to prevent shattering of a layer to be formed in later process over the edges of the drain electrode 6 and the source/pixel electrode 11.

With reference to FIGS. 4A and 4B, an amorphous silicon layer having a thickness in the range of 30–150 nanometers is then deposited entirely over the substrate by a plasma enhanced chemical vapor deposition method for subsequent deposition of a silicon nitride film having a thickness in the range of 200–500 nanometers over the amorphous silicon layer with keeping the vacuum state. Further, an aluminum film having a thickness in the range of 100–800 nanometers is deposited on the silicon nitride film by sputtering Al target. The laminations of the amorphous silicon layer, the silicon nitride film and the aluminum film are patterned so as to form the gate insulation film 3 over the amorphous silicon layer 4 and the gate electrode 2 over the gate insulation film 3 as well as to form the insulation film 3 over the amorphous silicon layer 4 and the reflective plate 5 over the insulation film 3.

An opposite substrate 9 with an opposite electrode 8 are superimposed over the substrate 1 through spherical spacers to form a space of 5 micrometers between the opposite electrode 8 and the reflective plate 5. The liquid crystal 7 is introduced into the space between the opposite electrode 8 and the reflective plate 5.

Second Embodiment

Figure 5:
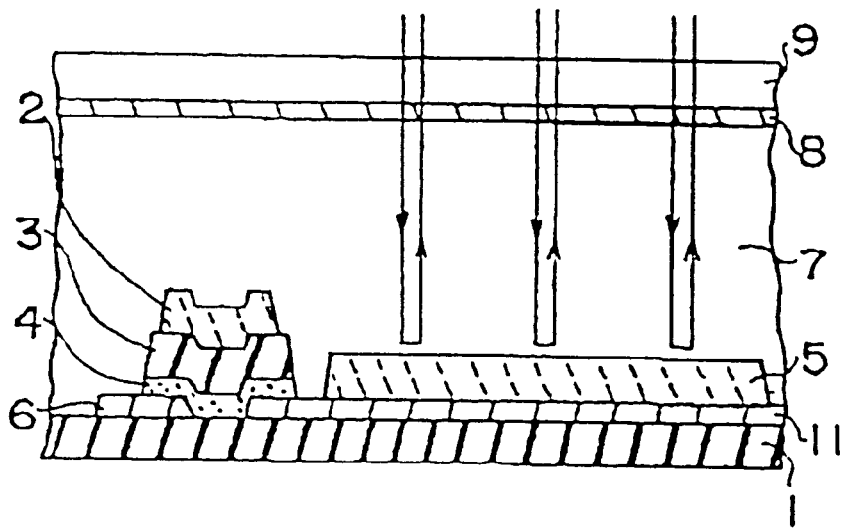
FIG. 5 is a fragmentary cross sectional elevation view illustrative of a novel reflective liquid crystal display in a second embodiment according to the present invention.
Figure 6:
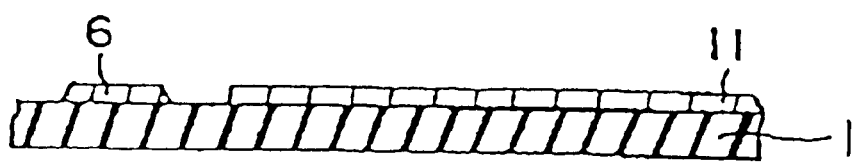
FIG. 6 is a fragmentary cross sectional elevation view illustrative of a reflective liquid crystal display substrate in a process involved in a method of fabricating a novel reflective liquid crystal display in a second embodiment according to the present invention.
Figure 7:
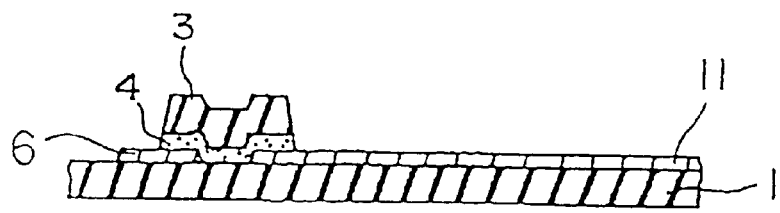
FIG. 7 is a fragmentary cross sectional elevation view illustrative of a reflective liquid crystal display substrate in another process involved in a method of fabricating a novel reflective liquid crystal display in a second embodiment according to the present invention.
Figure 8:
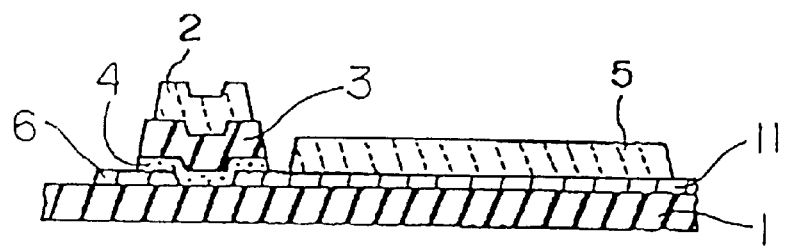
FIG. 8 is a fragmentary cross sectional elevation view illustrative of a reflective liquid crystal display substrate in still another process involved in a method of fabricating a novel reflective liquid crystal display in a second embodiment according to the present invention.

A second embodiment according to the present invention will be described with reference to FIGS. 5 through 8. FIG. 5 is a fragmentary cross sectional elevation view illustrative of a novel reflective liquid crystal display in a second embodiment according to the present invention. FIG. 6 is a fragmentary cross sectional elevation view illustrative of a reflective liquid crystal display substrate in a process involved in a method of fabricating a novel reflective liquid crystal display in a second embodiment according to the present invention. FIG. 7 is a fragmentary cross sectional elevation view illustrative of a reflective liquid crystal display substrate in another process involved in a method of fabricating a novel reflective liquid crystal display in a second embodiment according to the present invention. FIG. 8 is a fragmentary cross sectional elevation view illustrative of a reflective liquid crystal display substrate in still another process involved in a method of fabricating a novel reflective liquid crystal display in a second embodiment according to the present invention.

A reflective liquid crystal display has an integration of a plurality of pairs of a thin film transistor and a pixel electrode is formed on an insulation substrate 11 which may comprise a glass substrate. Each pair of the thin film transistor and the pixel electrode have the following structure. Source/drain electrodes 11 and 6 are formed on an insulation substrate. The source/drain electrodes 11 and 6 are separated from each other. A pixel electrode 11 is provided which has an end portion unitary formed with the source electrode 11 and the pixel electrode 11 extends over the insulation substrate 1. A semiconductor layer 4 extends over the insulation substrate 1 in contact directly with a gap between the source/drain electrodes 11 and 6 and also extends on at least respective parts of the source/drain electrodes 11 and 6 for connecting the source/drain electrodes 11 and 6. The source/drain electrodes 11 and 6 are made of a refractory metal such as Cr, W, Mo and Ti. Namely, differently from the first embodiment, the semiconductor layer 4 does not extend over the pixel electrode 11. A gate insulation film 3 extends over the semiconductor layer 4. A gate electrode 2 extends over the gate insulation film so that the gate electrode 2 is positioned to cover the semiconductor layer 4 and to be separated by the gate insulation film 3 from the semiconductor layer 4 for shielding the semiconductor layer 4 from incident light. A reflective plate 5 is formed on the pixel electrode 11 so as to be separated from the gate electrode 2 and from the semiconductor layer 4. The reflective plate 5 comprises a single metal film which extends on the pixel electrode 11 and is separated from the semiconductor layer 4. Although the single metal film may have a flat top surface, it is more preferable that the single metal film has a rough top surface for preventing excess reflection. The reflective plate 5 is preferably made of aluminum or aluminum-based alloys such as Al—Nd because aluminum and aluminum-based alloys have high reflectivity and are inexpensive. Notwithstanding, platinum, silver, platinum-based alloys and silver-based alloys are also available due to those high reflectivity. An opposite electrode 8 is supported on a surface of an opposite substrate 9 so that the opposite electrode 8 is separated by a space filled with a liquid crystal 7 from the gate electrode 2 and from the reflective plate 5 and also that the opposite electrode 8 faces to the gate electrode 2 and the reflective plate 5.

As a modification, it may be possible to further provide a color filter over the reflective plate 5. It may be also possible to further provide an inorganic film extending over an entire surface of the substrate 1 and under the source/drain electrodes 11 and 6 and the inorganic film is made of silicon oxide or silicon nitride.

The above reflective liquid crystal display may be operated as follows. Charges are supplied through the thin film transistor to the pixel electrode 11 unitary formed with the source electrode 11. As described above, the reflective plate 5 is made of high reflectivity metal such as aluminum, for which reason a capacitance is formed between the reflective plate 5 and the opposite electrode 8, whilst no capacitance is formed between the pixel electrode 11 and the reflective plate 5 in contact directly with the pixel electrode 11. The reflective plate 5 and the opposite electrode 8 are separated by the liquid crystal 7 to form the second capacitance "Clc". The liquid crystal 7 is optically changed by a voltage "Vlc" applied between the reflective plate 5 and the opposite electrode 8. When a voltage "V" is applied between the pixel electrode 11 or the source electrode 11 and the opposite electrode 8, the voltage "Vlc" is given by the equation of:

$$Vlc = V \tag{2}$$

The liquid crystal 7 is optically changed by the voltage "Vlc" which is controllable by controlling the voltage "V" to be applied between the pixel electrode 11 or the source electrode 11 and the opposite electrode 8.

The above reflective liquid crystal display may be fabricated as follows.

With reference to FIG. 6, a Cr film having a thickness of 50–100 nanometers is deposited on a glass substrate by sputtering Cr target. The Cr film is then patterned by a photo-lithography method and a printing method to form a drain electrode 6 and a source/pixel electrode 11. Preferably, the patterning is made to have edges of the drain electrode 6 and the source/pixel electrode 11 tapered to prevent shattering of a layer to be formed in later process over the edges of the drain electrode 6 and the source/pixel electrode 11.

With reference to FIG. 7, an amorphous silicon layer having a thickness in the range of 30–150 nanometers is then deposited entirely over the substrate by a plasma enhanced chemical vapor deposition method for subsequent deposition of a silicon nitride film having a thickness in the range of 200–500 nanometers over the amorphous silicon layer with keeping the vacuum state. The laminations of the amorphous silicon layer and the silicon nitride film are patterned so as to remove the laminations over the pixel electrode 11.

With reference to FIG. 8, an aluminum film having a thickness in the range of 100–800 nanometers is deposited on the silicon nitride film and on the pixel electrode 11 by sputtering Al target. The aluminum film is patterned to form the gate electrode 2 and the pixel electrode 11.

An opposite substrate 9 with an opposite electrode 8 are superimposed over the substrate 1 through spherical spacers to form a space of 5 micrometers between the opposite electrode 8 and the reflective plate 5. The liquid crystal 7 is introduced into the space between the opposite electrode 8 and the reflective plate 5.

Third Embodiment

Figure 9:
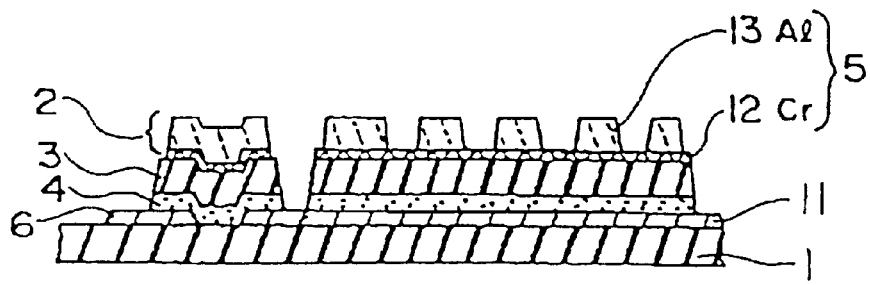
FIG. 9 is a fragmentary cross sectional elevation view illustrative of a reflective liquid crystal display substrate in a third embodiment according to the present invention.

A third embodiment according to the present invention will be described with reference to FIG. 9 which is a fragmentary cross sectional elevation view illustrative of a reflective liquid crystal display substrate in a third embodiment according to the present invention.

A reflective liquid crystal display has an integration of a plurality of pairs of a thin film transistor and a pixel electrode is formed on an insulation substrate 11 which may comprise a glass substrate. Each pair of the thin film transistor and the pixel electrode have the following structure. Source/drain electrodes 11 and 6 are formed on an insulation substrate. The source/drain electrodes 11 and 6 are separated from each other. A pixel electrode 11 is provided which has an end portion unitary formed with the source electrode 11 and the pixel electrode 11 extends over the insulation substrate 1. A semiconductor layer 4 extends over the insulation substrate 1 in contact directly with a gap between the source/drain electrodes 11 and 6 and also extends on at least respective parts of the source/drain electrodes 11 and 6 for connecting the source/drain electrodes 11 and 6. The source/drain electrodes 11 and 6 are made of a refractory metal such as Cr, W, Mo and Ti. Namely, the semiconductor layer 4 comprises a first semiconductor layer part extending over the source/drain electrodes 11 and 6 and over the insulation substrate 1 in contact directly with a gap between the source/drain electrodes 11 and 6, and a second semiconductor layer part extending over the pixel electrode 11 and is separated from the first semiconductor layer part. A gate insulation film 3 extends over entire parts of the semiconductor layer 4. Namely, the gate insulation film 3 comprises a first gate insulation film part extending over the first semiconductor layer part, and a second gate insulation film part extending over the second semiconductor layer part. A gate electrode 2 extends over the first gate insulation film part so that the gate electrode 2 is positioned to cover the semiconductor layer 4 and to be separated by the gate insulation film 3 from the semiconductor layer 4 for shielding the semiconductor layer 4 from incident light. A reflective plate 5 is formed over the pixel electrode 11 so as to be separated from the gate electrode 2 and from the semiconductor layer 4. The reflective plate 5 comprises a low reflectivity film 12 made of Cr continuously extending over the second gate insulation film part and a plurality of ridges 13 provided on the low reflectivity film 12 and each of the plurality of ridges 12 comprises a high reflectivity film made of Al. It is preferable that the low reflectivity film is made of chromium and the high reflectivity film is made of a metal selected from the group consisting of aluminum and aluminum-based alloys such as AlNd. It is also preferable that the low reflectivity film is made of chromium and the reflective plate is made of a metal selected from the group consisting of platinum, silver, platinum-based alloys and silver-based alloys. An opposite electrode is supported on a surface of an opposite substrate so that the opposite electrode is separated by a space filled with a liquid crystal from the gate electrode 2 and from the reflective plate 5 and also that the opposite electrode faces to the gate electrode 2 and the reflective plate 5.

As a modification, it may be possible to further provide a color filter over the reflective plate 5. It may be also possible to further provide an inorganic film extending over an entire surface of the substrate 1 and under the source/drain electrodes 31 and 6 and the inorganic film is made of silicon oxide or silicon nitride.

The above reflective liquid crystal display may be fabricated as follows. A Cr film having a thickness of 50–100 nanometers is deposited on a glass substrate by sputtering Cr target. The Cr film is then patterned by a photo-lithography method and a printing method to form a drain electrode 6 and a source/pixel electrode 11. Preferably, the patterning is made to have edges of the drain electrode 6 and the source/pixel electrode 11 tapered to prevent shattering of a layer to be formed in later process over the edges of the drain electrode 6 and the source/pixel electrode 11. An amorphous silicon layer having a thickness in the range of 30–150 nanometers is then deposited entirely over the substrate by a plasma enhanced chemical vapor deposition method for subsequent deposition of a silicon nitride film having a thickness in the range of 200–500 nanometers over the amorphous silicon layer with keeping the vacuum state. Further, a chromium film is deposited on the silicon nitride film by sputtering Cr target. The laminations of the amorphous silicon layer, the silicon nitride film and the chromium film are patterned so as to form the gate insulation film 3 over the amorphous silicon layer 4 as well as to form the insulation film 3 over the amorphous silicon layer 4 and the chromium film 12 over the insulation film 3. An aluminum film having a thickness in the range of 100–800 nanometers is deposited on the chromium film 12 by sputtering Al target. The aluminum film is then patterned by photo-lithography and dry etching process to form the gate electrode 2 on the gate insulation film 3 and a plurality of the ridges of Al over the insulation film 3. In the dry etching process, the chromium film serves as an etching stopper. An opposite substrate with an opposite electrode are superimposed over the substrate 1 through spherical spacers to form a space of 5 micrometers between the opposite electrode and the reflective plate 5. The liquid crystal 7 is introduced into the space between the opposite electrode 8 and the reflective plate 5.

Fourth Embodiment

Figure 10:
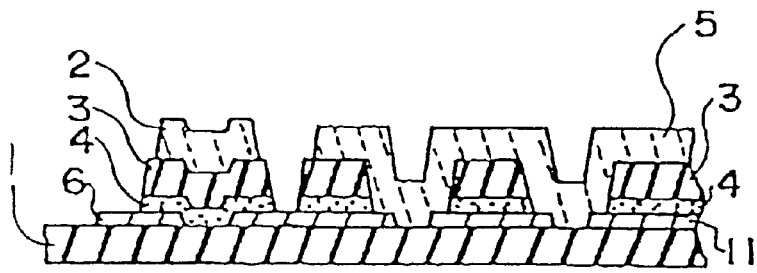
FIG. 10 is a fragmentary cross sectional elevation view illustrative of a reflective liquid crystal display substrate in a fourth embodiment according to the present invention.

A fourth embodiment according to the present invention will be described with reference to FIG. 10 which is a fragmentary cross sectional elevation view illustrative of a reflective liquid crystal display substrate in a fourth embodiment according to the present invention.

A reflective liquid crystal display has an integration of a plurality of pairs of a thin film transistor and a pixel electrode is formed on an insulation substrate 11 which may comprise a glass substrate. Each pair of the thin film transistor and the pixel electrode have the following structure. Source/drain electrodes 11 and 6 are formed on an insulation substrate. The source/drain electrodes 11 and 6 are separated from each other. A pixel electrode 11 is provided which has an end portion unitary formed with the source electrode 11 and the pixel electrode 11 comprises films which discontinuously extend over the insulation substrate 1. A semiconductor layer 4 comprises a first semiconductor layer part continuously extending over the source/drain electrodes 11 and 6 and the insulation substrate 1 in contact directly with the gap between the source/drain electrodes 11 and 6 for connecting the source/drain electrodes 11 and 6, and second semiconductor layer parts discontinuously extending over the pixel electrodes 11 and being separated from the first semiconductor layer part. The source/drain electrodes 11 and 6 are made of a refractory metal such as Cr, W, Mo and Ti. A gate insulation film 3 comprises a first gate insulation film part extending over the first semiconductor layer part, and second gate insulation film parts extending over the second semiconductor layer parts. A gate electrode 2 extends over the first gate insulation film part so that the gate electrode 2 is positioned to cover the semiconductor layer 4 and to be separated by the gate insulation film 3 from the semiconductor layer 4 for shielding the semiconductor layer 4 from incident light. A plurality of ridges are provided over the insulation substrate 1 and each of the plurality of ridges comprises laminations of the pixel electrode 11, the semiconductor layer 4 and the insulation film 3, and that the insulation substrate 3 is in contact directly with gaps between the plurality of ridges. The reflective plate 5 comprises a metal plate which continuously extends over the plurality of ridges and the insulation substrate 1 in contact directly with gaps between the plurality of ridges so that a top surface of the metal plate has concave and convex portions. The reflective plate 5 is formed over the pixel electrode 11 so as to be separated from the gate electrode 2 and from the semiconductor layer 4. The reflective plate 5 comprises a high reflectivity film made of Al. It is preferable that the reflective plate 5 is made of a metal selected from the group consisting of aluminum and aluminum-based alloys such as Al—Nd. It is also preferable that the reflective plate 5 is made of a metal selected from the group consisting of platinum, silver, platinum-based alloys and silver-based alloys. An opposite electrode is supported on a surface of an opposite substrate so that the opposite electrode is separated by a space filled with a liquid crystal 7 from the gate electrode 2 and from the reflective plate 5 and also that the opposite electrode faces to the gate electrode 2 and the reflective plate 5.

As a modification, it may be possible to further provide a color filter over the reflective plate 5. It may be also possible to further provide an inorganic film extending over an entire surface of the substrate 1 and under the source/drain electrodes 11 and 6 and the inorganic film is made of silicon oxide or silicon nitride.

The above reflective liquid crystal display may be fabricated as follows. A Cr film having a thickness of 50–100 nanometers is deposited on a glass substrate by sputtering Cr target. The Cr film is then patterned by a photo-lithography method and a printing method to form a drain electrode 6 and source/pixel electrodes 11 discontinuously extend over the substrate 1. Preferably, the patterning is made to have edges of the drain electrode 6 and the source/pixel electrode 11 tapered to prevent shattering of a layer to be formed in later process over the edges of the drain electrode 6 and the source/pixel electrode 11. An amorphous silicon layer having a thickness in the range of 30–150 nanometers is then deposited entirely over the substrate by a plasma enhanced chemical vapor deposition method for subsequent deposition of a silicon nitride film having a thickness in the range of 200–500 nanometers over the amorphous silicon layer with keeping the vacuum state. The laminations of the amorphous silicon layer and the silicon nitride film are patterned so as to form the gate insulation film 3 over the amorphous silicon layer 4 as well as to form a plurality of ridges each comprising the laminations of the Cr film, the amorphous silicon layer and the silicon nitride film over the substrate 1. Further, an aluminum film having a thickness in the range of 100–800 nanometers is deposited over the ridges and the substrate in contact directly with gaps between the ridges as well as over the gate insulation film by sputtering Al target. An opposite substrate with an opposite electrode are superimposed over the substrate 1 through spherical spacers to form a space of 5 micrometers between the opposite electrode and the reflective plate 5. The liquid crystal 7 is introduced into the space between the opposite electrode and the reflective plate 5.

In accordance with the foregoing present invention, the novel reflective liquid crystal display is free from deterioration in display caused by generation of carriers, for example, electron-hole pairs in a semiconductor layer connecting the source/drain electrode due to incidence of light into the semiconductor layer. The novel reflective liquid crystal display may be formed at a relatively low manufacturing cost. The novel reflective liquid crystal display is capable of a bright display with high contrast. The novel reflective liquid crystal display including thin film transistors shows highly reliable operations. The novel reflective liquid crystal display has a reflective plate with a sufficiently large thickness and a rough surface but free from excess reflection. The novel reflective liquid crystal display has a wide visible angle. The novel reflective liquid crystal display has gate electrodes with a reduced resistance but free of any substantial delay in transmission of signals. The novel reflective liquid crystal display is free from deterioration in characteristics of a thin film transistor in the reflective liquid crystal display. The novel reflective liquid crystal display has thin film transistors which have semiconductor layers free from exposure to liquid crystal in the reflective liquid crystal display. The novel reflective liquid crystal display has a semiconductor layer free from deterioration due to contamination to the semiconductor layer with aluminum caused by contacting an aluminum reflective plate to the semiconductor layer. The novel reflective liquid crystal display has an aluminum reflective plate free from deformations such as hillock. The novel reflective liquid crystal display may be formed without carrying out excess or additional fabrication processes at a relatively low manufacturing cost.

Whereas modifications of the present invention will be apparent to a person having ordinary skill in the art, to which the invention pertains, it is to be understood that embodiments as shown and described by way of illustrations are by no means intended to be considered in a limiting sense. Accordingly, it is to be intended to cover by claims any modifications of the present invention which fall within the spirit and scope of the present invention.

What is claimed is:

1. A reflective plate structure provided in a reflective liquid crystal display having a thin film transistor, comprising:

a pixel electrode formed as a single layer with a source electrode of the thin film transistor, said pixel electrode being immediately adjacent to said source electrode; and a reflective film extending over the pixel electrode and being separated from a gate electrode, said gate electrode being formed over a semiconductor layer of said thin film transistor.

2. The reflective plate structure as claimed in claim 1, wherein said reflective film comprises a single metal film having a flat top surface.

3. The reflective plate structure as claimed in claim 1, wherein said reflective plate structure comprises a single metal plate having a rough top surface.

4. The reflective plate structure as claimed in claim 1, wherein said reflective film is made of a metal selected from the group consisting of aluminum and aluminum-based alloys.

5. The reflective plate structure as claimed in claim 1, wherein said reflective film is made of a metal selected from the group consisting of platinum, silver, platinum-based alloys and silver-based alloys.

6. The reflective plate structure as claimed in claim 1, wherein said reflective film is electrically insulated from said pixel electrode.

7. The reflective plate structure as claimed in claim 1, wherein said reflective film is separated from said semiconductor layer.

8. The reflective plate structure of claim 1, further comprising:

a color filter over the reflective film.

9. The reflective plate structure of claim 1, further comprising:
   a substrate; and
   an inorganic film extending over an entire surface of the substrate and directly under said source electrode and said pixel electrode.

10. The reflective plate structure of claim 9, wherein said inorganic film is made of one of: silicon oxide and silicon nitride.

11. The reflective plate structure of claim 1, further comprising:
   a semiconductor layer extending over said pixel electrode.

12. The reflective plate structure of claim 11, further comprising:
   a gate insulation layer formed over said semiconductor layer.

13. The reflective plate structure of claim 12, wherein said reflective film is formed on said gate insulation layer.

14. The reflective plate structure of claim 13, wherein said reflective film comprises a single layered structure of the same metal as said gate electrode.

15. The reflective plate structure of claim 13, wherein said reflective film comprises a double layered structure comprising a Cr-layer and an Al-layer discontinuously extending with gaps over said Cr-layer.

16. The reflective plate structure of claim 1, wherein said pixel electrode discontinuously extends with gaps over a substrate, and wherein the reflective plate structure further comprises:
   a semiconductor layer discontinuously extending with gaps over said pixel electrode; and
   a gate insulating film discontinuously extending with gaps over said semiconductor layer, said reflective film continuously extending over said gate insulating film, and filling said gaps so that said reflective film is in contact directly with said gate insulating film, said semiconductor layer, said pixel electrode and said substrate.

17. The reflective plate structure of claim 16, wherein said reflective film comprises a single layered structure of the same metal as said gate electrode.

18. The reflective plate structure of claim 1, wherein said reflective film is formed on said pixel electrode.

19. The reflective plate structure of claim 18, wherein said reflective film comprises a single layered structure of the same metal as said gate electrode.

20. The reflective plate structure of claim 1, wherein said reflective film and said gate electrode are made of the same metal.

* * * * *